(12) United States Patent
Scott et al.

(10) Patent No.: US 8,011,260 B2
(45) Date of Patent: Sep. 6, 2011

(54) DOUBLE CHAIN LINEAR ACTUATOR

(75) Inventors: Jon Scott, Vancouver (CA); Eric Fetchko, Burnaby (CA)

(73) Assignee: Teleflex Canada Inc., Richmond (CA)

( * ) Notice: Subject to any disclaimer, the term of this patent is extended or adjusted under 35 U.S.C. 154(b) by 655 days.

(21) Appl. No.: 12/033,148

(22) Filed: Feb. 19, 2008

(65) Prior Publication Data
US 2008/0200294 A1    Aug. 21, 2008

Related U.S. Application Data

(60) Provisional application No. 60/890,688, filed on Feb. 20, 2007.

(51) Int. Cl.
*F16H 27/02*    (2006.01)

(52) U.S. Cl. .................................. 74/89.2

(58) Field of Classification Search ............ 49/325; 474/65, 206–212, 219, 227, 228, 273; 74/89, 74/89.2, 89.21, 89.25; 89/47; 403/109.6, 403/378, 379.5
See application file for complete search history.

(56) References Cited

U.S. PATENT DOCUMENTS

| | | | |
|---|---|---|---|
| 980,181 A | 1/1911 | Asbury | |
| 1,221,471 A | 4/1917 | Miller | |
| 1,945,357 A * | 1/1934 | Pierce | 474/210 |
| 1,965,285 A * | 7/1934 | Gilstad | 474/210 |
| 2,005,727 A * | 6/1935 | Benbow et al. | 298/35 R |
| 3,234,698 A | 2/1966 | Kimblern | |
| 3,742,775 A | 7/1973 | Hayes et al. | |
| 4,210,031 A | 7/1980 | Schmid | |
| 4,521,993 A | 6/1985 | Tacheny | |
| 4,719,840 A | 1/1988 | Goodell et al. | |
| 4,819,495 A | 4/1989 | Hormann | |
| 4,941,316 A | 7/1990 | Bechtold | |
| 5,271,182 A | 12/1993 | Greisner | |
| 5,355,643 A | 10/1994 | Bringolf | |
| 6,530,177 B1 | 3/2003 | Sorensen | |
| 6,787,702 B2 | 9/2004 | Suzuki | |
| 7,082,722 B1 * | 8/2006 | Sorensen | 49/506 |
| 2008/0199295 A1 | 8/2008 | Scott et al. | |
| 2009/0211220 A1 | 8/2009 | Scott et al. | |

FOREIGN PATENT DOCUMENTS

| | | |
|---|---|---|
| EP | 1 484 465 | 12/2004 |
| GB | 422 781 | 1/1935 |
| GB | 466 786 | 6/1937 |
| GB | 2 159 600 | 12/1985 |
| WO | WO 2005/033455 | 4/2005 |
| WO | WO 2005/108821 | 11/2005 |

* cited by examiner

*Primary Examiner* — Thomas R Hannon
*Assistant Examiner* — Alan Waits
(74) *Attorney, Agent, or Firm* — Cameron IP

(57) ABSTRACT

A linear actuator comprises a pair of chains. Each chain has a first link and a second link. The second link of each chain is adjacent to the first link of the chain. A pivotal connection pivotally connects the first and second links. The first link is pivotable about a pivot axis which is non-perpendicular to a longitudinal axis of the first link. A chain connecting member connects the chains at distal ends thereof. A drive mechanism moves the chains between an extended position and a retracted position. At least a portion of each chain is helically wound when the chains are in the retracted position.

9 Claims, 10 Drawing Sheets

US 8,011,260 B2

DOUBLE CHAIN LINEAR ACTUATOR

CROSS-REFERENCE TO RELATED APPLICATION

This application claims the benefit of provisional application 60/890,688 filed in the United States Patent and Trademark Office on Feb. 20, 2007, the complete disclosure of which is incorporated herein by reference and priority to which is claimed.

BACKGROUND OF THE INVENTION

The present invention relates to a double chain linear actuator and, in particular, to a double chain linear actuator having helically winding chains.

One measure of a linear actuator is the ratio of extended length to retracted length. For most linear actuators this ratio is 1.8 to 1. Although, there are linear actuators, such as scissor lifts and telescoping hydraulic jacks, in which the ratio of extended length to retracted length exceeds 3 to 1. This allows such linear actuators to provide a relatively large amount of movement while being positioned in a relatively small space. However, these linear actuators typically have a poor side load stiffness and/or require oil. For example, telescoping hydraulic jacks do not have particularly good side load stiffness and require oil. Accordingly, telescoping hydraulic jacks cannot be used in applications which require a good side load carrying capacity or where the use oil is not permissible.

It is known to provide linear actuators having extending and retracting chains, with inter-connected links, as disclosed in U.S. Pat. No. 5,271,182 to Greisner et al., and European Patent Application Number 1,484,465 to Soerensen. These prior art linear actuators have a good side load stiffness and do not require oil. However, they do not have a large extended length to retracted length ratio because a planar chain track, or chain path, is required within the actuator housing to guide the chain as it is being displaced. As a result, these types of linear actuators are typically used in applications where limited movement is required, or where there is no requirement for the linear actuator to be stored in a relatively small space.

SUMMARY OF THE INVENTION

The present invention provides a linear actuator having a helically winding chain, with inter-connected links, that does not require a planar chain track or chain path chain within the actuator housing. This allows for a linear actuator that does not require oil and has a large extended length to retracted length ratio, good axial stiffness, and good side load stiffness.

In particular, there is provided a linear actuator comprising a pair of chains. Each chain has a first link and a second link. The second link of each chain is adjacent to the first link of the chain. A pivotal connection pivotally connects the first and second links. The first link is pivotable about a pivot axis which is non-perpendicular to a longitudinal axis of the first link. A chain connecting member connects the chains at distal ends thereof. A drive mechanism moves the chains between an extended position and a retracted position. At least a portion of each chain is helically wound when the chains are in the retracted position.

BRIEF DESCRIPTION OF THE DRAWINGS

Referring to the drawings.

DETAILED DESCRIPTIONS OF THE PREFERRED EMBODIMENTS

Figure 1:
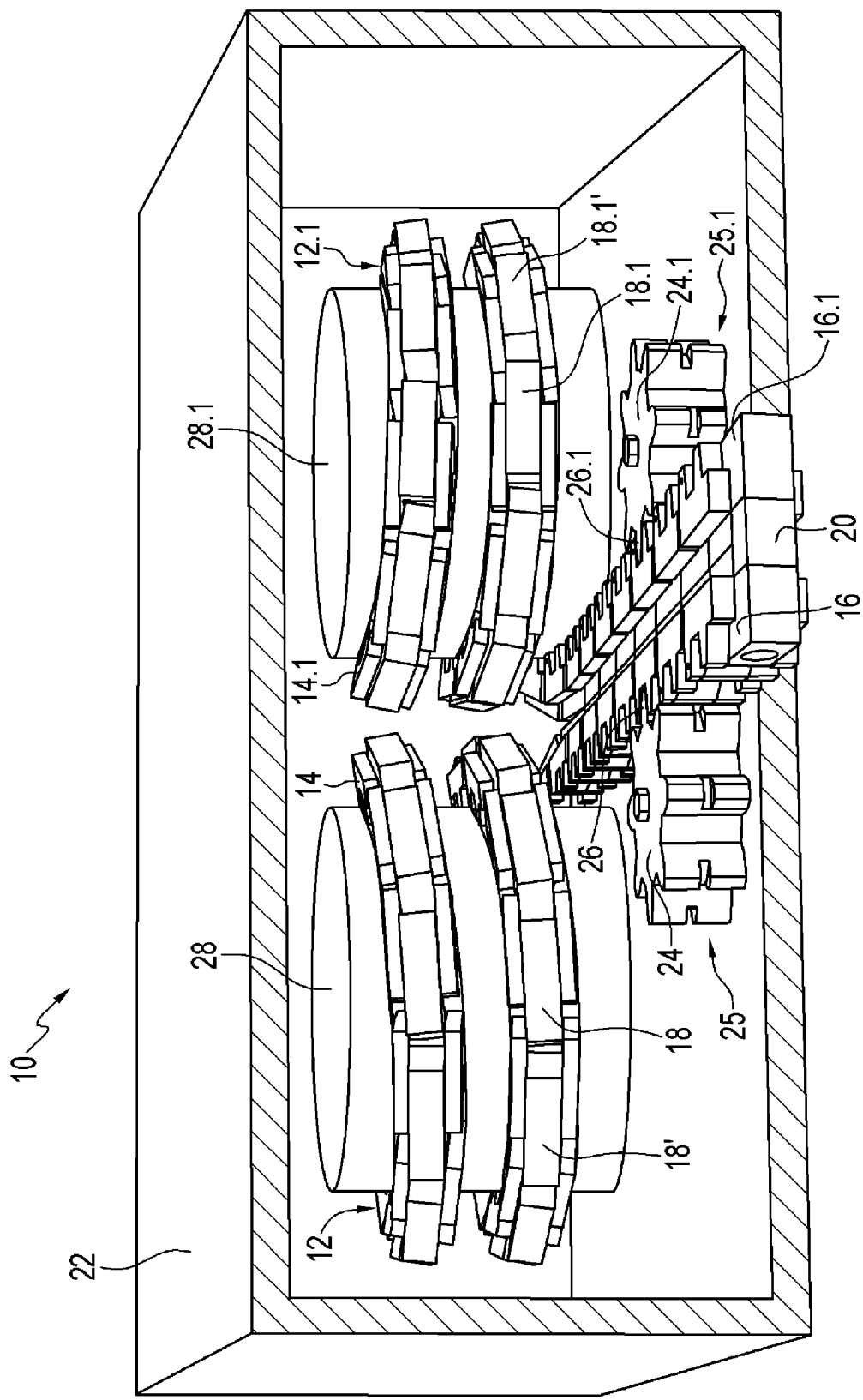
FIG. 1 is a front perspective, sectional view showing a double chain linear actuator with the chains in a retracted position.

Referring to the drawings, and first to FIG. 1, this shows a double chain linear actuator 10. The linear actuator 10 comprises a pair substantially identical helically winding chains 12 and 12.1 which are reciprocatingly received in an actuator housing 22. Each chain 12 and 12.1 has a proximal end link 14 and 14.1, a distal end link 16 and 16.1, and a plurality of inter-connected links 18 and 18.1 therebetween. A chain connecting member 20 connects the distal end links 14 and 14.1 of the chains 12 and 12.1. In this example, the chain connecting member 20 is a C-shaped holder. The chains 12 and 12.1 are movable between a retracted position shown in FIGS. 1 and 2, and an extended position shown in FIG. 3.

Figure 4:
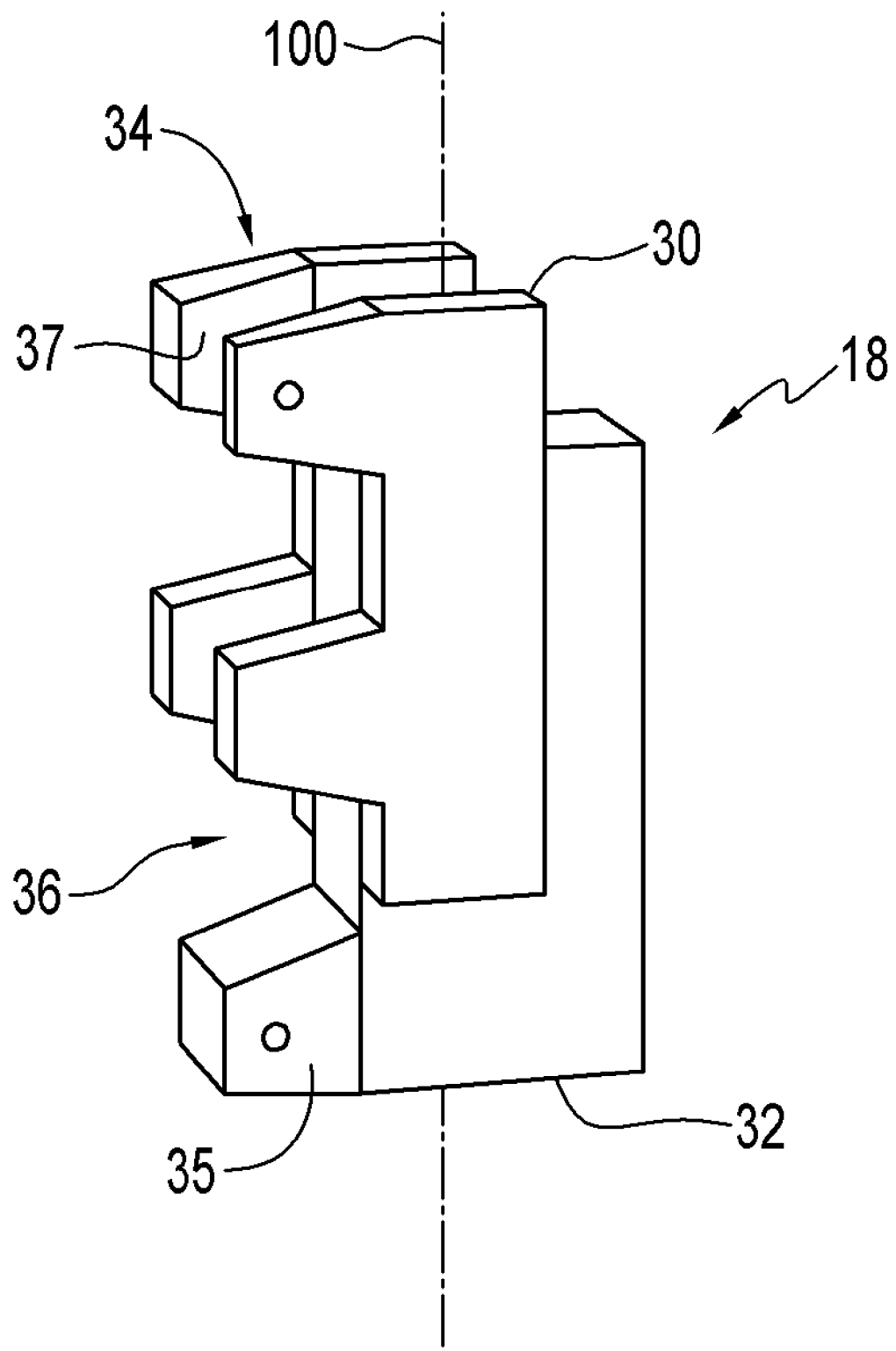
FIG. 4 is a perspective view showing a link of a chain of the linear actuator of FIG. 1 in greater detail.
Figure 5:
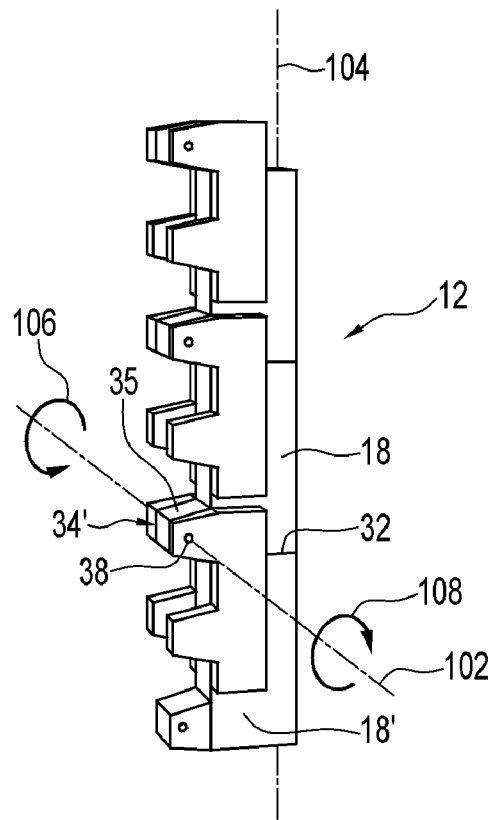
FIG. 5 is a perspective view showing a plurality of inter-connected links of a chain of the linear actuator of FIG. 1 aligned along a common axis.
Figure 6:
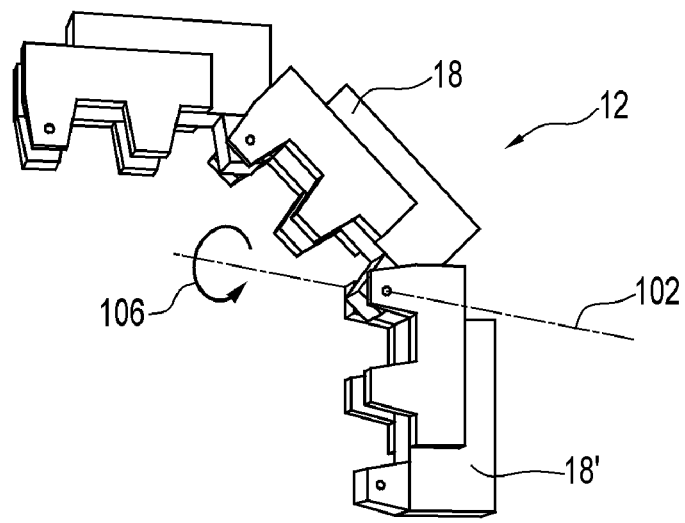
FIG. 6 is a perspective view showing a plurality of inter-connected links of a chain of the linear actuator of FIG. 1 extending about a curve.

Referring now to FIG. 4, a first one of the inter-connected links 18 of one of the chains 12 is shown in greater detail. The inter-connected links 18.1 of the other one of the chains 12.1 are substantially identical and accordingly are not described in detail herein. The link 18 has a first end 30, a second end 32, and a longitudinal axis 100. There is a clevis 34 at the first end 30 of the link 18. The clevis 34 has opposed inner mating surfaces. In FIG. 4, only one of inner mating surface 37 is shown. The inner mating surfaces are angularly tilted relative to the first end 30 of the link 18. There is a mating portion 35 near the second end 32 of the link 18. The mating portion 35 is angularly tilted relative to the second end 32 of the link 18. The link 18 is further configured to define a recess 36. As shown in FIGS. 5 and 6, the link 18 is pivotably connected, at its mating portion 35, to the clevis 34' of an adjacent second link 18' by a pivotal connection. In this example, the pivotal connection is a pin 38. The link 18 is pivotable about a pivot axis 102. The pivot axis 102 is non-perpendicular to the longitudinal axis 100 of the link 18 which is shown in FIG. 4.

As shown in FIG. 5, when the link 18 and the adjacent link 18' are aligned along a common longitudinal axis 104, the link 18 is pivotable about the pivot axis 102 in a first direction only.

The first direction is indicated generally by reference arrow 106. The link 18 is configured to prevent pivoting in a second direction when the link 18 and the adjacent link 18' are aligned along the common longitudinal axis 104. The second direction is indicated generally by reference numeral 108 and is opposite to the first direction 106. In this example, the second end 32 of the link 18 abuts the adjacent link 18' when the link 18 and the adjacent link 18' are aligned along the common longitudinal axis 104. The adjacent link 18' thereby acts as a stop to prevent the link 18 from pivoting in the second direction 108. FIG. 6 shows the link 18 pivoting in the first direction 106.

Figure 8:
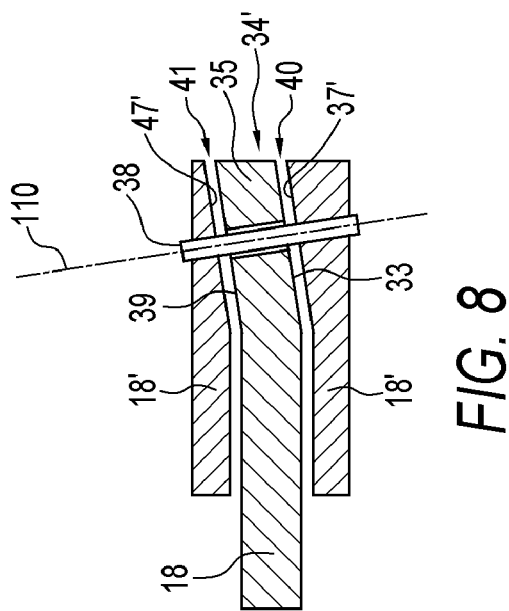
FIG. 8 is a sectional view taken along line A-A of FIG. 7.
Figure 7:
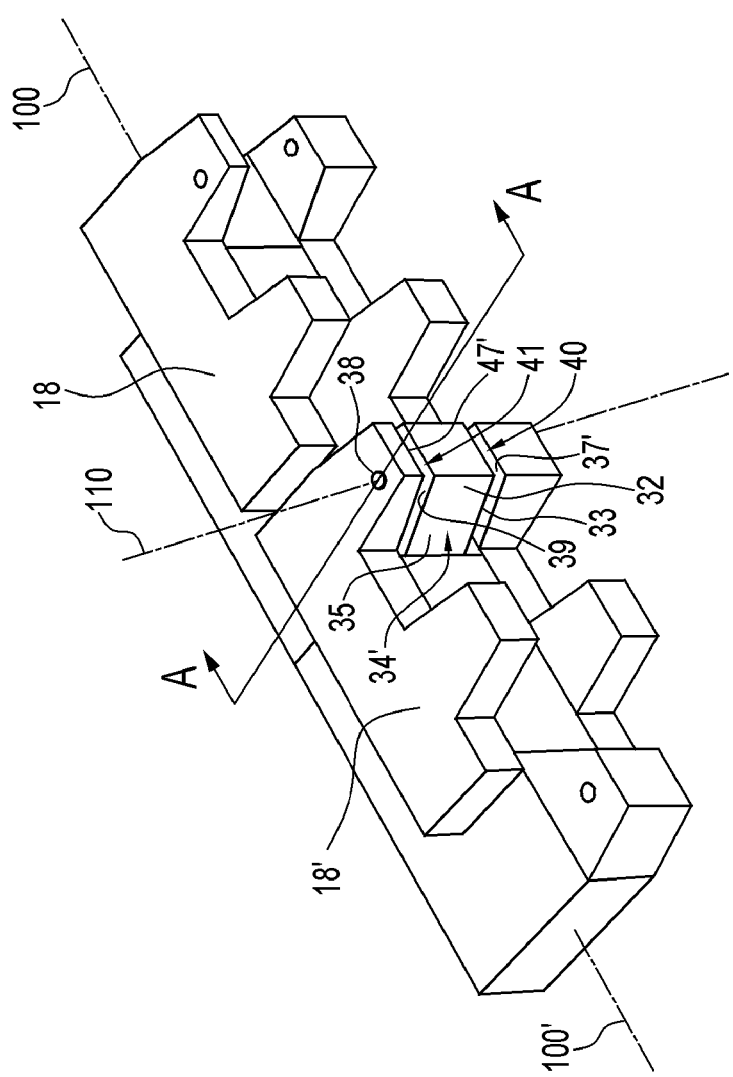
FIG. 7 is an isometric view showing a link and an adjacent link of a chain of the linear actuator of FIG. 1 aligned along a common axis.

The pivotable connection between the link 18 and the adjacent link 18' is best shown in FIGS. 7 and 8. The link 18 is connected, at its mating portion 35, by the pin 38 to the inner mating surfaces 37' and 47' of the clevis 34' of the adjacent link 18'. The pin 38 has a longitudinal axis 110. The longitudinal axis 110 of the pin 38 is co-axial with the pivot axis 102 which is shown in FIGS. 5 and 6. As best shown in FIG. 7, the longitudinal axis 110 of the pin 38 is non-perpendicular to the longitudinal axis 100 of the link 18. As best shown in FIG. 8, the longitudinal axis 110 of the pin 38 is also perpendicular to opposed inner mating surfaces 37' and 47' of the clevis 34' of the adjacent link 18'. Preferably the pin 38 is tilted in a plane which is perpendicular to the longitudinal axis 100 of the link 18, and in a plane which is parallel to the longitudinal axis 100 of the link 18. However, the pin 38 only needs to be tilted in one of the above-mentioned planes.

There are gaps 40 and 41 between the inner surfaces 37' and 47' of the clevis 34' of the adjacent link 18' and longitudinal side surfaces 33 and 39 of the link 18. The gaps 40 and 41 allow the link 18 to pivot about the pin 38 in a non-perpendicular manner relative to a longitudinal axis 100' of the adjacent link 18'. The link 18 is accordingly allowed to pivot between a position in which the link 18 is co-planar with the adjacent link 18' and a position in which the link 18 is non co-planar with the adjacent link 18'. This allows the chains 12 and 12.1 to helically wind, as shown in FIGS. 1 and 2.

Figure 9:
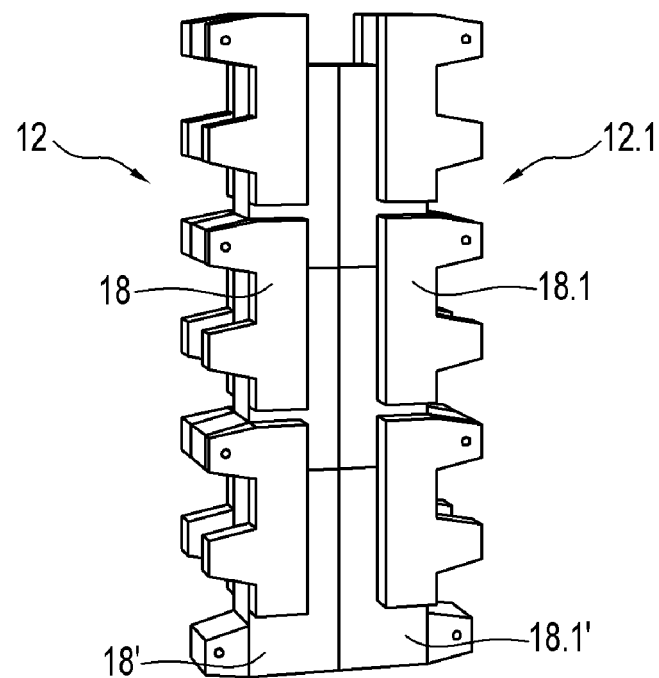
FIG. 9 is a perspective view showing a plurality of inter-connected links of both chains of the linear actuator of FIG. 1 aligned along a common axis.
Figure 10:
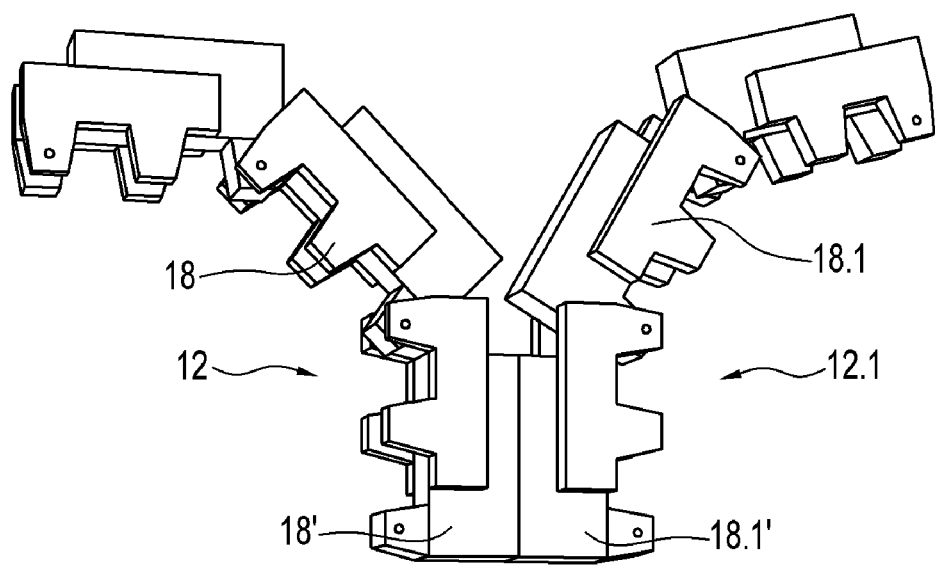
FIG. 10 is a perspective view showing a plurality of inter-connected links of both chains of the linear actuator of FIG. 1 extending about respective curves.
Figure 11:
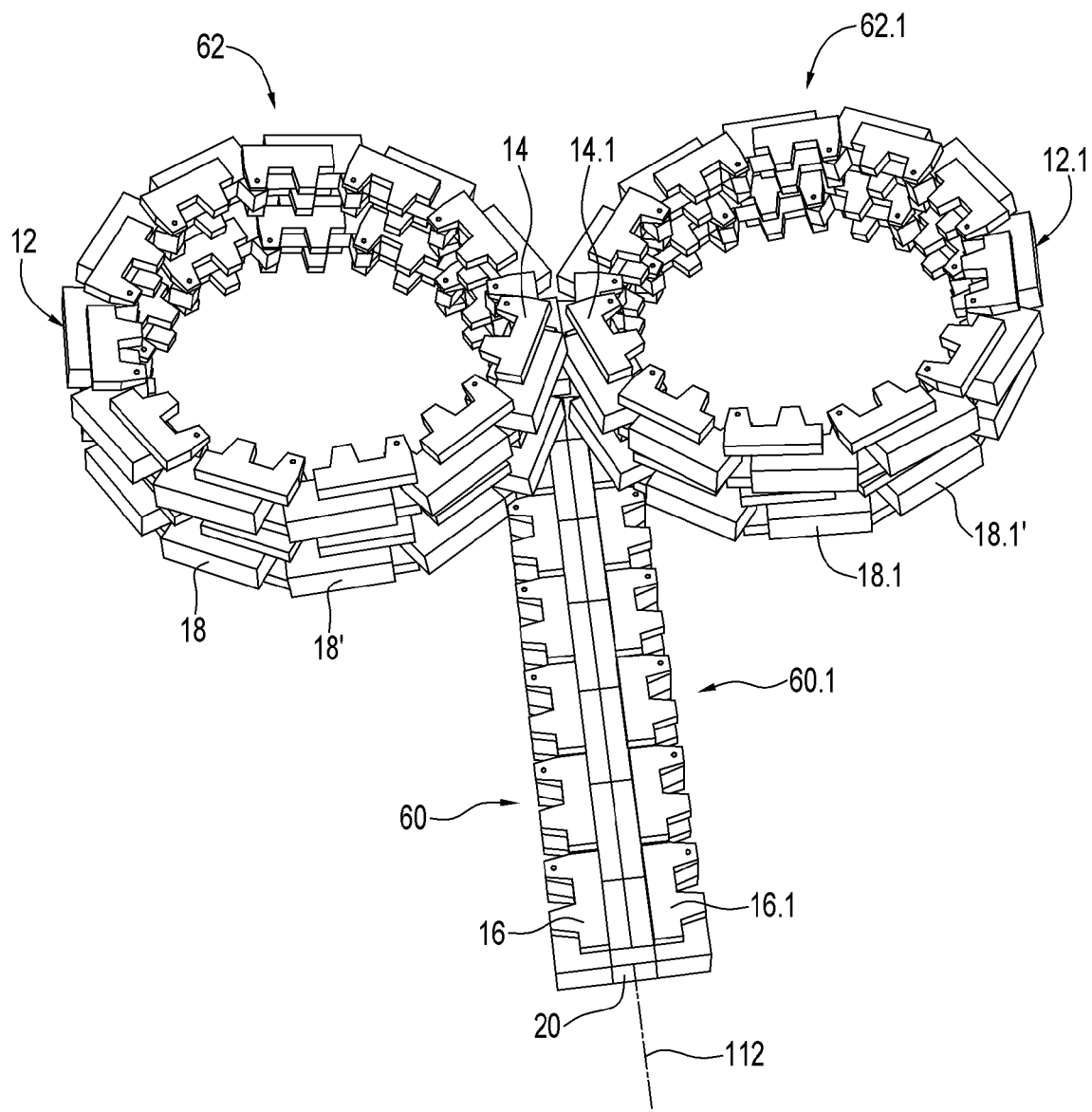
FIG. 11 is top perspective view showing the chains of the linear actuator of FIG. 1.
Figure 12:
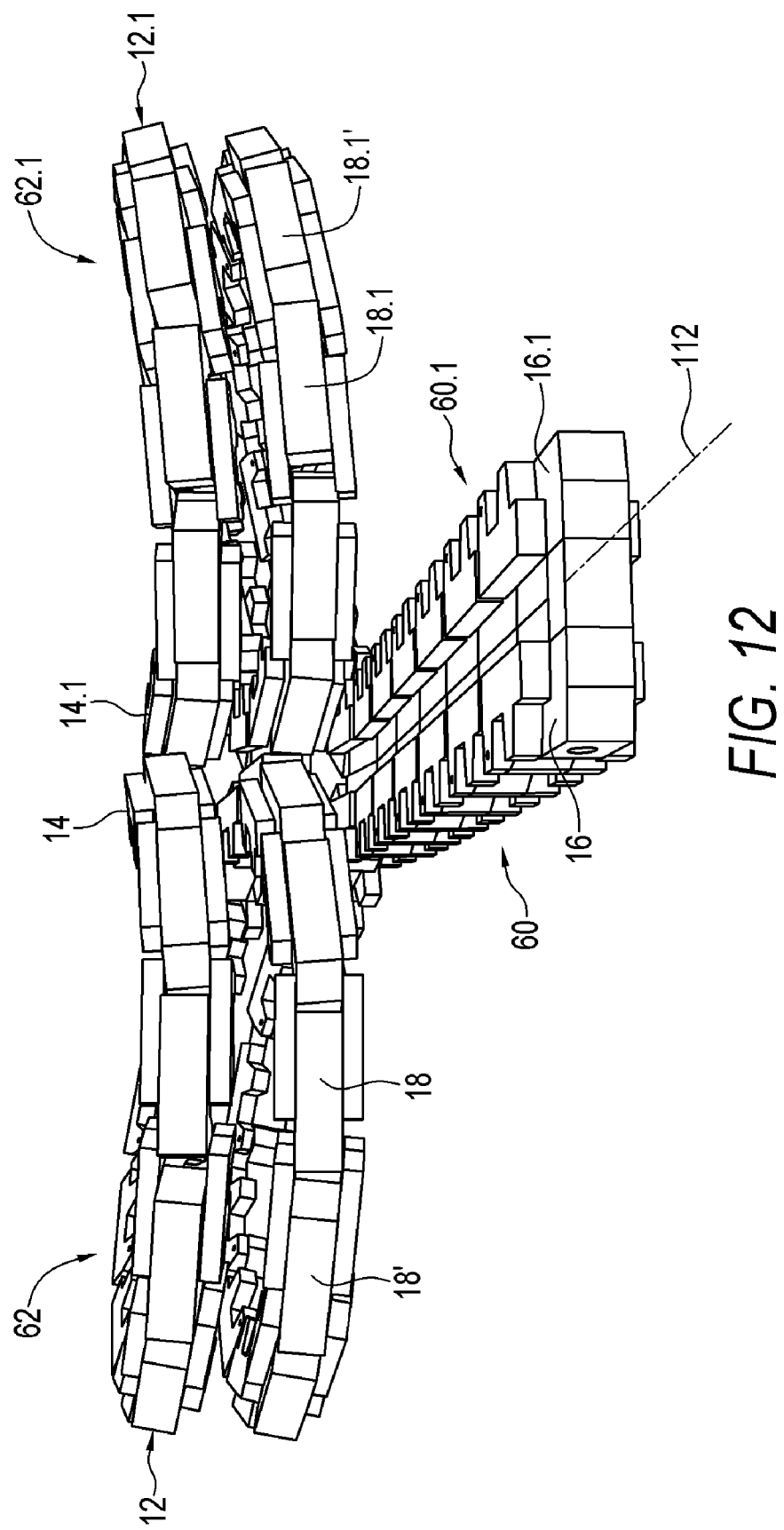
FIG. 12 is a front perspective view showing the chains of the linear actuator of FIG. 1.
Figure 13:
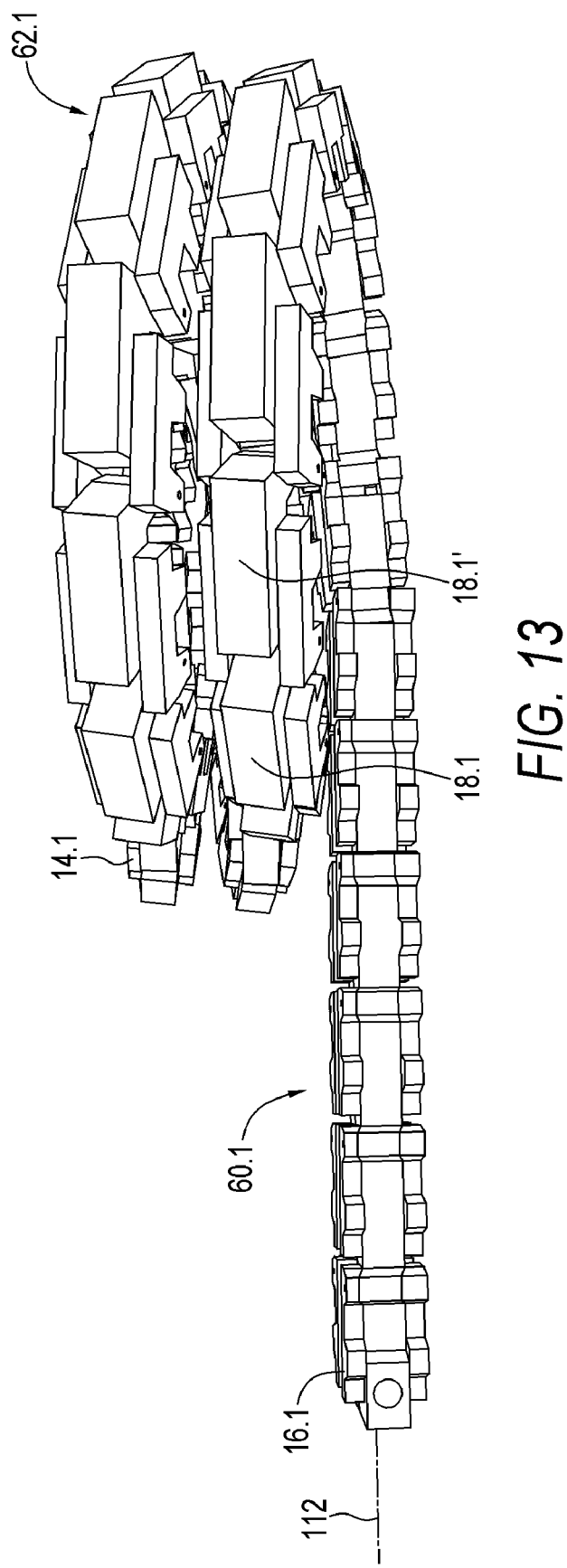
FIG. 13 is a side perspective view showing the chains of the linear actuator of FIG. 1.

In this example, the linear actuator 10 comprises a pair of chains 12 and 12.1. In the extended position, the chains 12 and 12.1 longitudinally abut as shown, in fragment, in FIG. 9. This increases the axial stiffness of the actuator 10. From the position shown in FIG. 9, each link 18 on one of the chains 12 is pivotable in a direction away from a corresponding link 18.1 on the other one of the chains 12.1 and towards a position shown in FIG. 10. This allows the chains 12 and 12.1 to move between an extended configuration and a helically wound configuration. As shown in FIGS. 11 to 13, the chains 12 and 12.1 may each have extended portions 60 and 60.1 which are aligned along a common axis 112, and helically wound portions 62 and 62.1.

Figure 2:
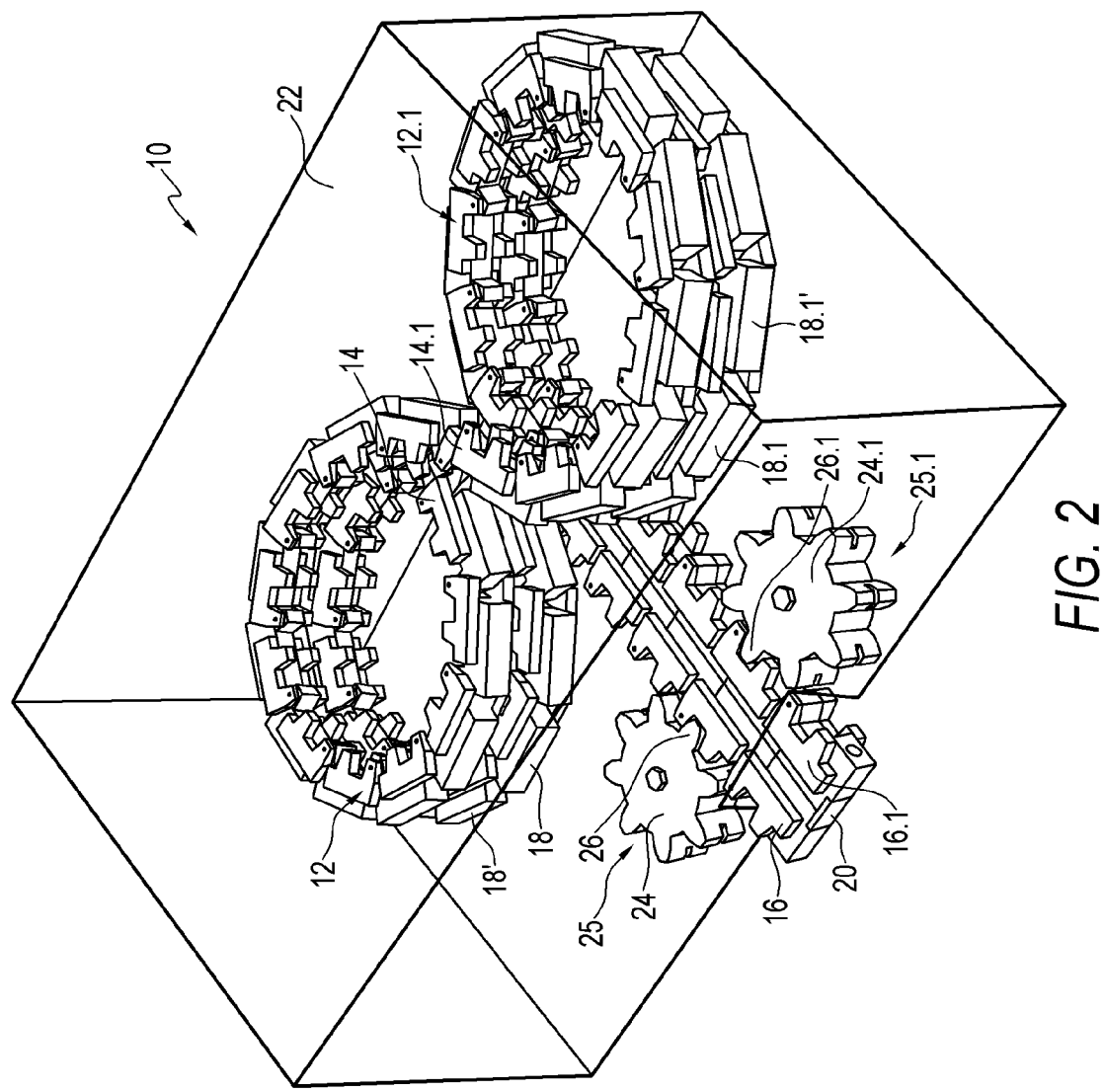
FIG. 2 is a top isometric view showing the linear actuator of FIG. 1 with the actuator housing shown in ghost.
Figure 3:
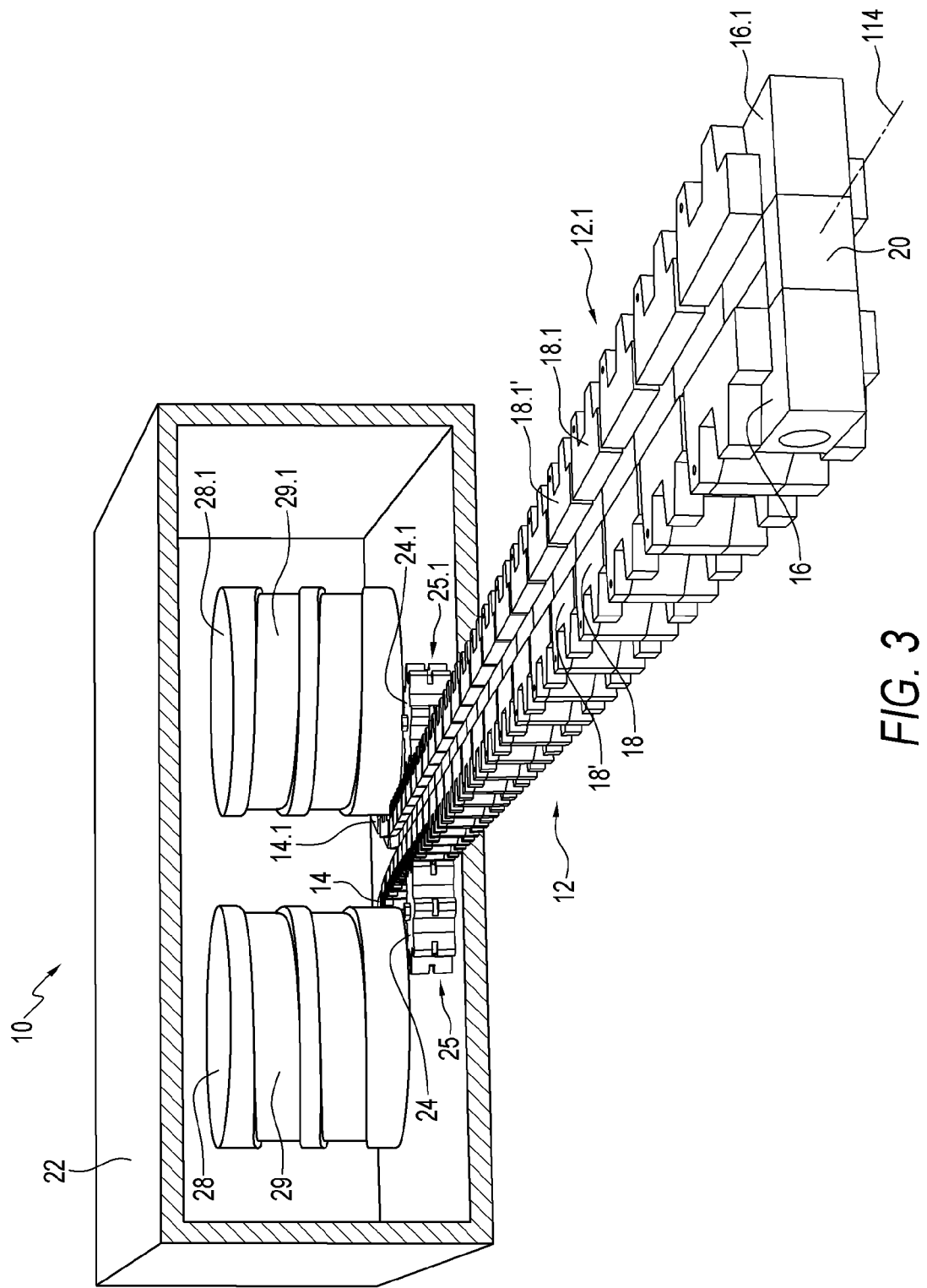
FIG. 3 is a front perspective, sectional view showing the linear actuator of FIG. 1 with the chains in an extended position.

In this example, drive mechanisms 25 and 25.1, shown in FIGS. 1 to 3, move the chains 12 and 12.1 between the retracted position shown in FIGS. 1 and 2, and the extended position shown in FIG. 3. As best shown in FIG. 2, in the retracted position, the distal end links 16 and 16.1 of the chains 12 and 12.1 are substantially disposed within the actuator housing 22 and at least a portion of each chain 12 and 12.1 is helically wound about a corresponding roller 28 and 28.1. The rollers 28 and 28.1 are disposed with the actuator housing 22. As best shown in FIG. 3, in the extended position, the chains 12 and 12.1 extend at least partially and linearly outside the actuator housing 22 with the distal end links 16 and 16.1 the each chains 12 and 12.1 being disposed outside the actuator housing 22. At least one inter-connected link 18 and 18.1 of each chain 12 and 12.1 is aligned along a common axis 114 with at least one adjacent inter-connected link 18' and 18.1' when the chains 12 and 12.1 are in the extended position.

The drive mechanisms 25 and 25.1 include sprockets 24 and 24.1 which are powered by a motor (not shown). The sprockets 24 and 24.1 have sprocket teeth 26 and 26.1, which engage the recesses 36 and 36.1 in the links 18 and 18.1 to move the chains 12 and 12.1 between the retracted position and the extended position. Although in this example, each of the chains 12 and 12.1 is moved by a corresponding drive mechanism, it will be understood by a person skilled in the art that because the chains 12 and 12.1 are coupled, only one of the chains needs to be actuated by a drive mechanism.

The chains 12 and 12.1 are moved about the rollers 28 and 28.1 along channels 29 and 29.1, which are shown in FIG. 3. The channels 29 and 29.1 are ramped allowing the chains 12 and 12.1 to be stored in a plurality of levels within the actuator housing 22. This allows for compact storage of the chains 12 and 12.1 resulting in a linear actuator that does not require oil and has a large extended length to retracted length ratio, good axial stiffness, and good side load stiffness.

It will be understood by someone skilled in the art that many of the details provided above are by way of example only and are not intended to limit the scope of the invention which is to be determined with reference to the following claims.

What is claimed is:

1. A linear actuator comprising:
a pair of chains, each chain having a first link and a second link, the second link being adjacent to the first link;
a pin pivotally connecting the first link of each chain to the second link of said each chain, the pin having a longitudinal axis which non-perpendicular to a longitudinal axis of the first link and being co-axial with a pivot axis about which the first link is pivotal;
a chain connecting member connecting the chains at distal ends thereof, and
a drive mechanism for moving the chains between an extended position and a retracted position, wherein at least a portion of each chain is helically wound when the chains are in the retracted position.

2. The linear actuator as claimed in claim 1, wherein the first link of each chain and the second link of said each chain are longitudinally aligned along a common axis when the chains are in the extended position.

3. The linear actuator as claimed in claim 1, wherein the first link of each chain is pivotable about the pivot axis in only a first direction when the first link and the second link of said each chain are aligned along a common axis.

4. The linear actuator as claimed in claim 3, wherein the second link of each chain acts as a stop to prevent the first link of said each chain from pivoting about the pivot axis in a second direction when the first link and the second link of said each chain link are aligned along the common axis, the second direction being opposite to the first direction.

5. The linear actuator as claimed in claim 1, wherein the first link and the second link of at least one of the chains each has a recess and the drive mechanism includes a sprocket with sprocket teeth, the sprocket teeth engaging the recesses to move the chains between the extended position and the retracted position.

6. The linear actuator as claimed in claim 1, further including an actuator housing, the chains extending at least partially and linearly outside the actuator housing when the chains are in the extended position.

7. The linear actuator as claimed in claim 6, wherein the chains longitudinally abut outside the housing.

8. The linear actuator as claimed in claim 6, further including a pair of rollers disposed within the actuator housing, each of the chains being at least partially ramped about a respective one of the rollers when the chains are in the retracted position.

9. The linear actuator as claimed in claim 1, wherein the connecting member is a C-shaped holder.

* * * * *